(12) United States Patent
Okuda et al.

(10) Patent No.: US 11,597,398 B2
(45) Date of Patent: Mar. 7, 2023

(54) VEHICLE CONTROL APPARATUS

(71) Applicant: TOYOTA JIDOSHA KABUSHIKI KAISHA, Toyota (JP)

(72) Inventors: Koichi Okuda, Toyota (JP); Atsushi Tabata, Okazaki (JP); Masafumi Yamamoto, Nagakute (JP); Yoshito Sekiguchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 262 days.

(21) Appl. No.: 17/096,409

(22) Filed: Nov. 12, 2020

(65) Prior Publication Data

US 2021/0146941 A1    May 20, 2021

(30) Foreign Application Priority Data

Nov. 15, 2019    (JP) .............................. JP2019-207445

(51) Int. Cl.
*B60W 50/00* (2006.01)
*B60W 50/06* (2006.01)
*G01C 21/34* (2006.01)
*B60W 60/00* (2020.01)
*B60W 10/18* (2012.01)
(Continued)

(52) U.S. Cl.
CPC ............ *B60W 50/06* (2013.01); *B60W 10/18* (2013.01); *B60W 10/20* (2013.01); *B60W 60/001* (2020.02); *G01C 21/3484* (2013.01); *G06F 8/65* (2013.01); *H04L 67/34* (2013.01); *H04W 4/024* (2018.02); *H04W 4/40* (2018.02); *B60W 2556/45* (2020.02)

(58) Field of Classification Search
CPC .... B60W 50/06; B60W 60/001; B60W 10/18; B60W 10/20; B60W 2556/45; H04W 4/024; H04W 4/40; G01C 21/3484; G06F 8/65; H04L 67/34
See application file for complete search history.

(56) References Cited

U.S. PATENT DOCUMENTS

2015/0281906 A1* 10/2015 Tseng .................... H04W 4/027
2017/0300313 A1* 10/2017 Gantt ........................ G06F 8/65
(Continued)

FOREIGN PATENT DOCUMENTS

JP    2004-140526 A    5/2004
JP    2011-33361 A    2/2011
(Continued)

*Primary Examiner* — Gertrude Arthur Jeanglaude
*Assistant Examiner* — Brittany Renee Peko
(74) *Attorney, Agent, or Firm* — Oliff PLC

(57) ABSTRACT

When a required download time is equal to or shorter than a communication-enabled time on a running route, an update program is received from an external device via wireless communication, so a vehicular program is appropriately updated. Besides, when the required download time is longer than the communication-enabled time on the running route, a driving method ensuring the communication-enabled time that is equal to or longer than the required download time is suggested to a driver, so the update program is easy to receive via wireless communication. In consequence, the opportunities to update the vehicular program can be ensured. That is, the vehicular program can be restrained or prevented from being updated with a delay.

8 Claims, 4 Drawing Sheets

(51) Int. Cl.
*G06F 8/65* (2018.01)
*H04L 67/00* (2022.01)
*H04W 4/024* (2018.01)
*H04W 4/40* (2018.01)
*B60W 10/20* (2006.01)

(56) References Cited

U.S. PATENT DOCUMENTS

| | | | |
|---|---|---|---|
| 2018/0321047 A1 | 11/2018 | Sagawa | |
| 2019/0258467 A1* | 8/2019 | Frantz | G01C 21/20 |
| 2019/0315293 A1* | 10/2019 | Arai | B60R 16/0231 |
| 2020/0371773 A1* | 11/2020 | Kato | G06F 8/65 |
| 2020/0371774 A1* | 11/2020 | Kato | G06F 8/65 |

FOREIGN PATENT DOCUMENTS

| | | | | |
|---|---|---|---|---|
| JP | 2017-090092 A | 5/2017 | | |
| JP | 2018-5894 A | 1/2018 | | |
| KR | 20210057619 A | * 11/2019 | | B60R 16/02 |

\* cited by examiner

| AT GEAR STAGE | C1 | C2 | B1 | B2 | F1 |
|---|---|---|---|---|---|
| 1st | ○ | | | △ | ○ |
| 2nd | ○ | | ○ | | |
| 3rd | ○ | ○ | | | |
| 4th | | ○ | ○ | | |
| Rev | ○ | | | ○ | |

VEHICLE CONTROL APPARATUS

CROSS-REFERENCE TO RELATED APPLICATION

This application claims priority to Japanese Patent Application No. 2019-207445 filed on Nov. 15, 2019, incorporated herein by reference in its entirety.

BACKGROUND

1. Technical Field

The present disclosure relates to a vehicle control apparatus that performs the update of a vehicular program.

2. Description of Related Art

A vehicle control apparatus that performs the update of a vehicular program through the use of an update program received from an external device that exists separately from a vehicle via wireless communication is well-known. For instance, an in-vehicle download control apparatus described in Japanese Unexamined Patent Application Publication No. 2017-90092 (JP 2017-90092 A) is such an example. It is disclosed in JP 2017-90092 A that an acquired running route of a vehicle is classified into maladaptation zones unsuitable for downloading data and adaptation zones suitable for downloading the data, that a time required for downloading the data is acquired, that that one of the adaptation zones which has a length enabling completion of the downloading of the data within a single adaptation zone is detected based on the time required for downloading the data, and that a starting point for downloading the data is set within that one of the adaptation zones.

SUMMARY

By the way, in the case where the time required for downloading the data is a certain length, none of the adaptation zones may have a length that is long enough to ensure a running time longer than the time required for downloading the data. In such a case, the starting point for downloading the data cannot be set. In other words, no single adaptation zone can be set as a download zone. As a result, the number of opportunities to update a vehicular program may decrease. In other words, the vehicular program may be updated with a delay. Incidentally, it is conceivable to set the download zone as a plurality of separate adaptation zones. However, the downloading of the data is not completed unless a length that is long enough to ensure the time required for downloading the data is obtained from the entirety of those zones. Therefore, the same problem of the vehicular program being updated with a delay arises even in the case where the download zone is set as separate zones.

The present disclosure has been made in view of the foregoing circumstances. It is an object of the present disclosure to provide a vehicle control apparatus that can restrain or prevent a vehicular program from being updated with a delay.

The gist of the first aspect consists in a vehicle control apparatus (a) that updates a vehicular program through the use of an update program received from an external device that exists separately from a vehicle via wireless communication. The vehicle control apparatus includes (b) a required time calculation unit that calculates a required download time that is needed to receive the update program, (c) a communication-enabled time estimation unit that calculates an estimated value of a communication-enabled time that allows the update program to be received from the external device via the wireless communication, (d) a download performance unit that receives the update program from the external device via the wireless communication, when the required download time is equal to or shorter than the estimated value of the communication-enabled time, and (e) a driving method suggestion unit that suggests, to a driver, a driving method ensuring the communication-enabled time that is equal to or longer than the required download time, when the required download time is longer than the estimated value of the communication-enabled time.

Besides, the second aspect consists in that the communication-enabled time estimation unit calculates the estimated value of the communication-enabled time, based on a running distance and a running speed in a case where the vehicle runs along a running route determined in advance from a current vehicle position to a predetermined destination, in the vehicle control apparatus described in the first aspect.

Besides, the third aspect consists in that the communication-enabled time estimation unit calculates the estimated value of the communication-enabled time, based on a feasibility of the wireless communication on a running route determined in advance from a current vehicle position to a predetermined destination, in the vehicle control apparatus described in the first aspect or the second aspect.

Besides, the fourth aspect consists in that the communication-enabled time estimation unit calculates the estimated value of the communication-enabled time, based on a past running pattern adopted by the driver, in the vehicle control apparatus described in any one of the first to third aspects.

Besides, the fifth aspect consists in that the driving method suggestion unit suggests, as the driving method, a driving plan that does not use a running route determined in advance from a current vehicle position to a predetermined destination but uses a new running route from the vehicle position to the destination, in the vehicle control apparatus described in any one of the first to fourth aspects.

Besides, the sixth aspect consists in that the driving method suggestion unit sets the new running route, based on a past running pattern adopted by the driver, in the vehicle control apparatus described in the fifth aspect.

Besides, the seventh aspect consists in that the driving method suggestion unit sets the new running route, based on a feasibility of the wireless communication on the running route from the vehicle position to the destination, in the vehicle control apparatus described in the fifth aspect or the sixth aspect.

Besides, the eighth aspect consists in that the driving method suggestion unit suggests, as the driving method, automated driving for causing the vehicle to run by automatically accelerating or decelerating, braking, and steering the vehicle, in the vehicle control apparatus described in any one of the first to fourth aspects.

According to the first aspect, when the required download time is equal to or shorter than the estimated value of the communication-enabled time, the update program is received from the external device via wireless communication. Therefore, the vehicular program is appropriately updated. Besides, when the required download time is longer than the estimated value of the communication-enabled time, the driving method ensuring the communication-enabled time that is equal to or longer than the required download time is suggested to the driver. Therefore, the update program is easy to receive via wireless communication. In consequence, the opportunities to update the vehicular program can be ensured. That is, the vehicular program can be restrained or prevented from being updated with a delay.

Besides, according to the second aspect, the estimated value of the communication-enabled time is calculated based on the running distance and the running speed in the case where the vehicle runs along the running route determined in advance from the current vehicle position to the predetermined destination. Therefore, the estimated value of the communication-enabled time is appropriately calculated, and the update program is appropriately received, or the driving method ensuring the communication-enabled time is appropriately suggested.

Besides, according to the third aspect, the estimated value of the communication-enabled time is calculated based on the feasibility of wireless communication on the running route determined in advance. Therefore, the estimated value of the communication-enabled time is appropriately calculated, and the update program is appropriately received, or the driving method ensuring the communication-enabled time is appropriately suggested.

Besides, according to the fourth aspect, the estimated value of the communication-enabled time is calculated based on the past running pattern adopted by the driver. Therefore, the estimated value of the communication-enabled time is appropriately calculated, and the update program is appropriately updated, or the driving method ensuring the communication-enabled time is appropriately suggested.

Besides, according to the fifth aspect, as the driving method ensuring the communication-enabled time, the driving plan that does not use the running route determined in advance but uses the new running route from the current vehicle position to the predetermined destination is suggested. Therefore, the update program is easy to receive appropriately via wireless communication.

Besides, according to the sixth aspect, the new running route is set based on the past running pattern adopted by the driver. Therefore, the driving plan ensuring the communication-enabled time is appropriately suggested.

Besides, according to the seventh aspect, the new running route is set based on the feasibility of wireless communication on the running route from the current vehicle position to the predetermined destination. Therefore, the driving plan ensuring the communication-enabled time is appropriately suggested.

Besides, according to the eighth aspect, automated driving is suggested as the driving method ensuring the communication-enabled time. Therefore, the update program is easy to receive appropriately via wireless communication.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

In each of the embodiments of the present disclosure, the vehicle is equipped with a motive power source and a motive power transmission device. The motive power transmission device is equipped with a transmission. The speed ratio of this transmission is "a rotational speed of an input-side rotary member/a rotational speed of an output-side rotary member". The high side of this speed ratio is a high vehicle speed side where the speed ratio is small. The low side of the speed ratio is a low vehicle speed side where the speed ratio is large. For example, the lowest speed ratio is a lowest vehicle speed-side speed ratio at which the vehicle speed is the lowest, and is a maximum speed ratio assuming the largest value.

Besides, the motive power source is, for example, an engine that generates motive power through the combustion of fuel, such as a gasoline engine or a diesel engine. Besides, the vehicle may be equipped with an electric motor or the like as the motive power source, in addition to the engine or instead of the engine. In the broad sense of the term, the electric motor is an engine.

One of the embodiments of the present disclosure will be described hereinafter in detail.

Figure 1:
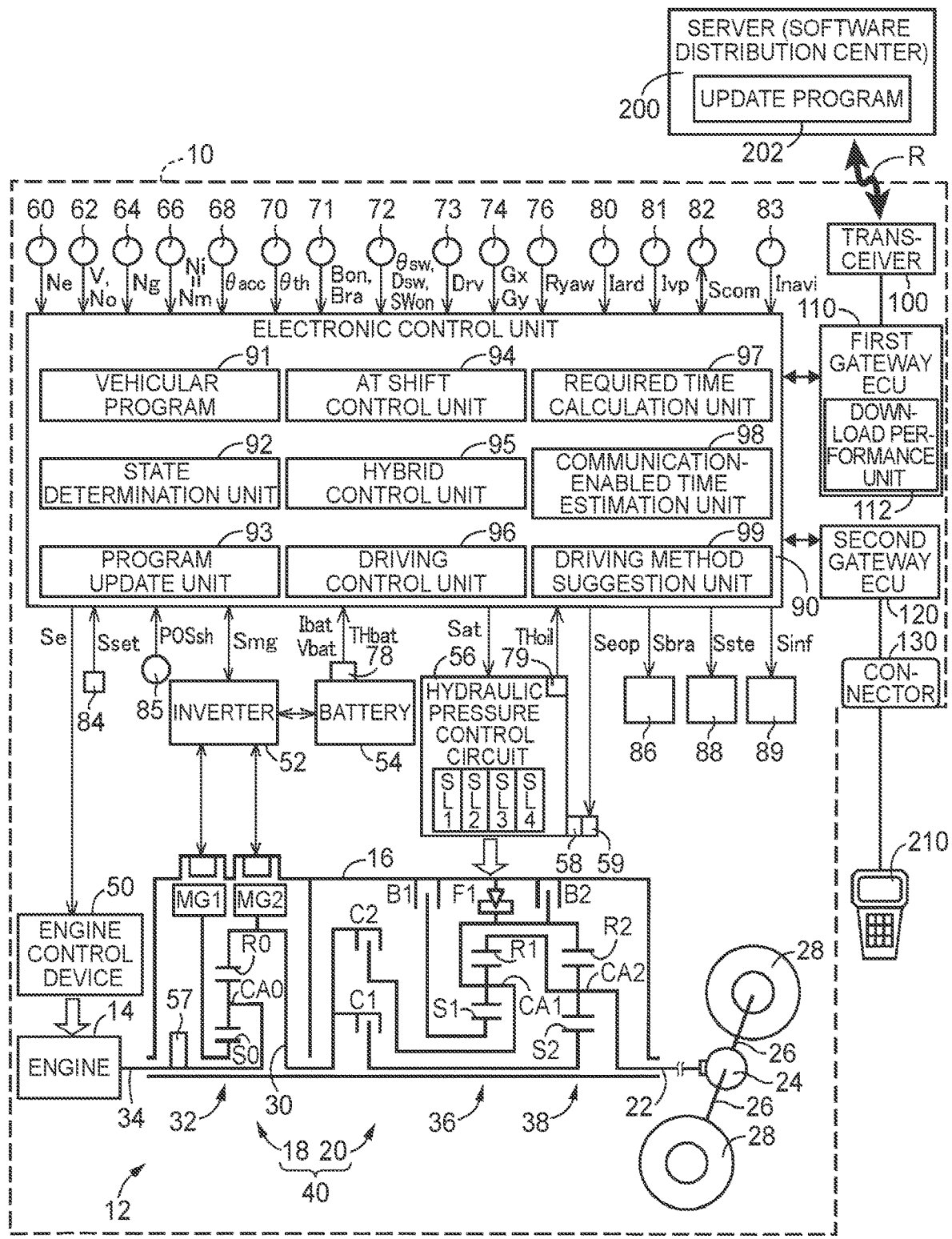
FIG. 1 is a view illustrating the general configuration of a vehicle to which the present disclosure is applied, and is a view illustrating the essence of control functions and a control system for various kinds of control in the vehicle.

FIG. 1 is a view illustrating the general configuration of a motive power transmission device 12 with which a vehicle 10 to which the present disclosure is applied is equipped, and is a view illustrating the essence of a control system for various kinds of control in the vehicle 10. In FIG. 1, the vehicle 10 is equipped with an engine 14, a first rotating machine MG1, and a second rotating machine MG2. The motive power transmission device 12 is equipped with an electric continuously variable shift unit 18, a mechanical stepped shift unit 20, and the like that are disposed in series on a common axis in a transmission case 16 as a non-rotary member that is attached to a vehicle body. The electric continuously variable shift unit 18 is coupled to the engine 14 directly or indirectly via a damper (not shown) or the like. The mechanical stepped shift unit 20 is coupled to an output side of the electric continuously variable shift unit 18. Besides, the motive power transmission device 12 is equipped with a differential gear unit 24 coupled to an output shaft 22 as an output rotary member of the mechanical stepped shift unit 20, a pair of axles 26 coupled to the differential gear unit 24, and the like. In the motive power transmission device 12, the motive power that is output from the engine 14 and the second rotating machine MG2 is transmitted to the mechanical stepped shift unit 20, and is transmitted from the mechanical stepped shift unit 20 to driving wheels 28 with which the vehicle 10 is equipped, via the differential gear unit 24 and the like. Incidentally, the transmission case 16, the electric continuously variable shift unit 18, and the mechanical stepped shift unit 20 will be referred to hereinafter as the case 16, the continuously variable shift unit 18, and the stepped shift unit 20, respectively. Besides, motive power is synonymous with torque and force unless otherwise specified. Besides, the continuously variable shift unit 18, the stepped shift unit 20, and the like are substantially symmetrically configured with respect to the common axis, and lower half portions thereof below the axis are omitted in FIG. 1. The common axis is an axis of a crankshaft of the engine 14, a coupling shaft 34 that will be described later, and the like.

The engine 14 is an engine that functions as a motive power source capable of generating a drive torque, and is a known internal combustion engine, for example, a gasoline engine or a diesel engine. In the engine 14, an engine torque Te as an output torque of the engine 14 is controlled through the control of engine control devices 50 such as a throttle actuator, a fuel injection device, and an ignition device with which the vehicle 10 is equipped, by an electronic control unit 90 that will be described later. In the present embodiment, the engine 14 is coupled to the continuously variable shift unit 18 without the intermediary of a hydraulic transmission device such as a torque converter or a fluid coupling.

Each of the first rotating machine MG1 and the second rotating machine MG2 is a rotating electrical machine that functions as a motor and as a generator, and is a so-called motor-generator. Each of the first rotating machine MG1 and the second rotating machine MG2 is connected to a battery 54 with which the vehicle 10 is equipped, via an inverter 52 with which the vehicle 10 is equipped. The inverter 52 of the first rotating machine MG1 and the inverter 52 of the second rotating machine MG2 are controlled by the electronic control unit 90 that will be described later, and an MG1 torque Tg as an output torque of the first rotating machine MG1 and an MG2 torque Tm as an output torque of the second rotating machine MG2 are thereby controlled, respectively. For example, in the case of positive rotation, the output torque of a rotating machine is a power running torque as a positive torque on the acceleration side, and is a regenerative torque as a negative torque on the deceleration side. The battery 54 is an electric power storage device that gives/receives electric power to/from the first rotating machine MG1 and the second rotating machine MG2.

The continuously variable shift unit 18 is equipped with the first rotating machine MG1, and a differential mechanism 32 as a motive power distribution mechanism that mechanically distributes the motive power of the engine 14 to the first rotating machine MG1 and an intermediate transmission member 30 as an output rotary member of the continuously variable shift unit 18. The second rotating machine MG2 is coupled to the intermediate transmission member 30 in such a manner as to enable the transmission of motive power. The continuously variable shift unit 18 is an electric continuously variable transmission in which the differential state of the differential mechanism 32 is controlled through the control of the operating state of the first rotating machine MG1. The first rotating machine MG1 is a rotating machine capable of controlling an engine rotational speed Ne as a rotational speed of the engine 14, and is equivalent to a differential rotating machine. The second rotating machine MG2 is a rotating machine that functions as a motive power source capable of generating a drive torque, and is equivalent to a running drive rotating machine. The vehicle 10 is a hybrid vehicle equipped with the engine 14 and the second rotating machine MG2, as a motive power source for running. The motive power transmission device 12 transmits the motive power of the motive power source to the driving wheels 28. Incidentally, the control of the operating state of the first rotating machine MG1 is the performance of operational control of the first rotating machine MG1.

The differential mechanism 32 is configured as a single pinion-type planetary gear device, and is equipped with a sun gear S0, a carrier CA0, and a ring gear R0. The engine 14 is coupled to the carrier CA0 via the coupling shaft 34 in such a manner as to enable the transmission of motive power, the first rotating machine MG1 is coupled to the sun gear S0 in such a manner as to enable the transmission of motive power, and the second rotating machine MG2 is coupled to the ring gear R0 in such a manner as to enable the transmission of motive power. In the differential mechanism 32, the carrier CA0 functions as an input element, the sun gear S0 functions as a reactive element, and the ring gear R0 functions as an output element.

The stepped shift unit 20 is a mechanical shift mechanism as a stepped transmission constituting part of a motive power transmission path between the intermediate transmission member 30 and the driving wheels 28, namely, a mechanical shift mechanism constituting part of the motive power transmission path between the continuously variable shift unit 18 and the driving wheels 28. The intermediate transmission member 30 also functions as an input rotary member of the stepped shift unit 20. The second rotating machine MG2 is coupled to the intermediate transmission member 30 in such a manner as to rotate integrally therewith, or the engine 14 is coupled to an input side of the continuously variable shift unit 18. Therefore, the stepped shift unit 20 is a transmission that constitutes part of the motive power transmission path between the motive power source (the second rotating machine MG2 or the engine 14) and the driving wheels 28. The intermediate transmission member 30 is a transmission member for transmitting the motive power of the motive power source to the driving wheels 28. The stepped shift unit 20 is a known planetary gear-type automatic transmission that is equipped with a plurality of sets of planetary gear devices, for example, a first planetary gear device 36 and a second planetary gear device 38, and a plurality of engagement devices such as a clutch C1, a clutch C2, a brake B1, and a brake B2, including a one-way clutch F1. The clutch C1, the clutch C2, the brake B1, and the brake B2 will be referred to simply as engagement devices CB if no distinction is required in particular.

Each of the engagement devices CB is a hydraulic frictional engagement device constituted by a multi-plate clutch or brake or a single-plate clutch or brake that is pressed by a hydraulic actuator, a band brake that is tightened by a hydraulic actuator, or the like. Torque capacities of the engagement devices CB are changed by adjusted engagement pressures of the engagement devices CB that are output from solenoid valves SL1 to SL4 and the like in a hydraulic pressure control circuit 56 with which the vehicle 10 is equipped, respectively. Thus, the operation state of each of the engagement devices CB is changed over between engagement, release, and the like.

In the stepped shift unit 20, respective rotary elements of the first planetary gear device 36 and the second planetary gear device 38 are partially coupled to one another, and are coupled to the intermediate transmission member 30, the case 16, or the output shaft 22, directly or indirectly via the engagement devices CB and the one-way clutch F1. The rotary elements of the first planetary gear device 36 are a sun gear S1, a carrier CA1, and a ring gear R1. The rotary elements of the second planetary gear device 38 are a sun gear S2, a carrier CA2, and a ring gear R2.

The stepped shift unit 20 is a stepped transmission in which one of a plurality of shift stages (which are also referred to as gear stages) with different speed ratios (which are also referred to as gear ratios) γat (=an AT input rotational speed Ni/an output rotational speed No) is formed through engagement of one of the engagement devices, for example, a predetermined one of the engagement devices. That is, a changeover among the gear stages, namely, shifting is carried out in the stepped shift unit 20, through engagement of one of the engagement devices. The stepped shift unit 20 is a stepped automatic transmission in which one of the gear stages is formed. In the present embodiment, the gear stage formed in the stepped shift unit 20 is referred to as an AT gear stage. The AT input rotational speed Ni is an input rotational speed of the stepped shift unit 20 as a rotational speed of the input rotary member of the stepped shift unit 20, is the same value as the rotational speed of the intermediate transmission member 30, and is the same value as the MG2 rotational speed Nm as a rotational speed of the second rotating machine MG2. The AT input rotational speed Ni can be expressed as the MG2 rotational speed Nm. The output rotational speed No is a rotational speed of the output shaft 22 as an output rotational speed of the stepped shift unit 20, and is also an output rotational speed of a complex transmission 40 as an entire transmission including the continuously variable shift unit 18 and the stepped shift unit 20.

Figures 2, 3:
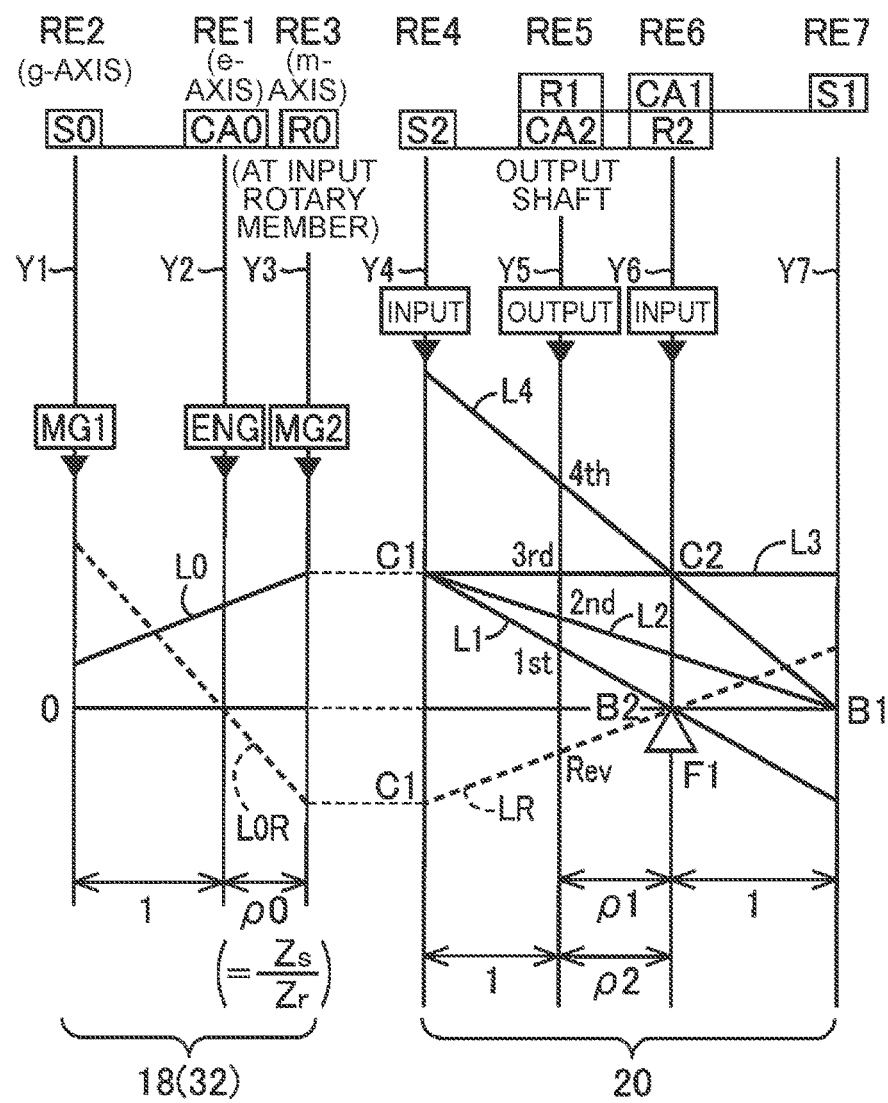
FIG. 2 is an operation chart illustrating a relationship between a shift operation of a mechanical stepped shift unit exemplified in FIG. 1 and a combination of operations of engagement devices used for the shift operation.
FIG. 3 is a collinear diagram representing a relative relationship among rotational speeds of various rotary elements in an electric continuously variable shift unit and the mechanical stepped shift unit.

As shown in, for example, an engagement operation chart of FIG. 2, four forward AT gear stages, namely, AT first-speed ("1st" in FIG. 2) to AT fourth-speed ("4th" in FIG. 2) gear stages are formed as a plurality of AT gear stages in the stepped shift unit 20. The AT first-speed gear stage has a largest speed ratio γat, and the speed ratio γat decreases as the AT gear stage shifts toward the high side. Besides, a backward AT gear stage ("Rev" in FIG. 2) is formed through, for example, engagement of the clutch C1 and engagement of the brake B2. That is, as will be described later, for example, the AT first-speed gear stage is formed when the vehicle runs backward. The engagement operation chart of FIG. 2 summarizes a relationship between each of the AT gear stages and each of the operation states of the engagement devices. That is, the engagement operation chart of FIG. 2 summarizes a relationship between each of the AT gear stages and predetermined ones of the engagement devices engaged at each of the AT gear stages. In FIG. 2, each "circle" represents engagement, each "triangle" represents engagement at the time of engine brake and at the time of a coast downshift of the stepped shift unit 20, and each "blank" represents release.

In the stepped shift unit 20, a changeover among the AT gear stages that are formed in accordance with the operation of an accelerator by a driver, a vehicle speed V, and the like is made, namely, the AT gear stages are selectively formed by the electronic control unit 90 that will be described later. For example, in shift control of the stepped shift unit 20, a so-called clutch-to-clutch shift for making a shift through replacement of the engaged one of the engagement devices CB, namely, a changeover between engagement and release of the engagement devices CB is carried out. In the present embodiment, for example, a downshift from the AT second-speed gear stage to the AT first-speed gear stage is expressed as a 2→1 downshift. The same holds true for other upshifts and downshifts.

The vehicle 10 is further equipped with an MOP 57 as a mechanical oil pump, an EOP 58 as an electric oil pump, and the like. The MOP 57 is coupled to the coupling shaft 34, and is rotated together with the engine 14 to discharge the hydraulic oil used in the motive power transmission device 12. The EOP 58 is rotated by a dedicated motor 59 for an oil pump with which the vehicle 10 is equipped, to discharge hydraulic oil. The hydraulic oil discharged by the MOP 57 and the EOP 58 is supplied to the hydraulic pressure control circuit 56, and serves as a source of the engagement pressure of each of the engagement devices CB.

FIG. 3 is a collinear diagram representing a relative relationship among rotational speeds of the respective rotary elements in the continuously variable shift unit 18 and the stepped shift unit 20. In FIG. 3, three vertical lines Y1, Y2, and Y3 corresponding to the three rotary elements of the differential mechanism 32 constituting the continuously variable shift unit 18 are a g-axis representing a rotational speed of the sun gear S0 corresponding to a second rotary element RE2, an e-axis representing a rotational speed of a carrier CA0 corresponding to a first rotary element RE1, and an m-axis representing a rotational speed of the ring gear R0 corresponding to a third rotary element RE3 (i.e., an input rotational speed of the stepped shift unit 20), respectively. Besides, four vertical lines Y4, Y5, Y6, and Y7 of the stepped shift unit 20 are an axis representing a rotational speed of the sun gear S2 corresponding to a fourth rotary element RE4, an axis representing a rotational speed of the ring gear R1 and the carrier CA2 that are coupled to each other and that correspond to a fifth rotary element RE5 (i.e., a rotational speed of the output shaft 22), an axis representing a rotational speed of the carrier CA1 and the ring gear R2 that are coupled to each other and that correspond to a sixth rotary element RE6, and an axis representing a rotational speed of the sun gear S1 corresponding to a seventh rotary element RE7, respectively. Clearances among the vertical lines Y1, Y2, and Y3 are determined by a gear ratio ρ0 of the differential mechanism 32. Besides, clearances among the vertical lines Y4, Y5, Y6, and Y7 are determined in accordance with a gear ratio ρ1 of the first planetary gear device 36 and a gear ratio ρ2 of the second planetary gear device 38. In a relationship among the vertical lines of the collinear diagram, when there is a clearance corresponding to "1" between the sun gear and the carrier, there is a clearance corresponding to the gear ratio ρ(=the number Zs of teeth of the sun gear/the number Zr of teeth of the ring gear) of the planetary gear device between the carrier and the ring gear.

As an expression using the collinear diagram of FIG. 3, the differential mechanism 32 of the continuously variable shift unit 18 is configured such that the engine 14 (refer to "ENG" in FIG. 3) is coupled to the first rotary element RE1, the first rotating machine MG1 (refer to "MG1" in FIG. 3) is coupled to the second rotary element RE2, and the second rotating machine MG2 (refer to "MG2" in FIG. 3) is coupled to the third rotary element RE3 that rotates integrally with the intermediate transmission member 30 to transmit rotation of the engine 14 to the stepped shift unit 20 via the intermediate transmission member 30. In the continuously variable shift unit 18, a relationship between the rotational speed of the sun gear S0 and the rotational speed of the ring gear R0 is indicated by straight lines L0 and L0R that cross the vertical line Y2.

Besides, in the stepped shift unit 20, the fourth rotary element RE4 is selectively coupled to the intermediate transmission member 30 via the clutch C1, the fifth rotary element RE5 is coupled to the output shaft 22, the sixth rotary element RE6 is selectively coupled to the intermediate transmission member 30 via the clutch C2 and is selectively coupled to the case 16 via the brake B2, and the seventh rotary element RE7 is selectively coupled to the case 16 via the brake B1. In the stepped shift unit 20, the rotational speeds "1st", "2nd", "3rd", "4th", and "Rev" of the output shaft 22 are indicated by straight lines L1, L2, L3, L4, and LR crossing the vertical line Y5 through engagement/release control of the engagement devices CB, respectively.

The straight lines L0, L1, L2, L3, and L4 indicated by solid lines in FIG. 3 represent relative speeds of the rotary elements in forward running in a hybrid running mode that enables hybrid running in which the vehicle runs with at least the engine 14 serving as a motive power source, respectively. In this hybrid running mode, in the differential mechanism 32, when a reactive torque as a negative torque generated by the first rotating machine MG1 is input to the sun gear S0 at the time of positive rotation for the engine torque Te that is input to the carrier CA0, an engine directly-transmitted torque Td $(=Te/(1+\rho 0)=-(1/\rho 0)\times Tg)$ appears in the ring gear R0 at the time of positive rotation. Then, a summated torque of the engine directly-transmitted torque Td and the MG2 torque Tm is transmitted to the driving wheels 28, in accordance with a required drive force, via the stepped shift unit 20 in which one of the AT first-speed to AT fourth-speed gears is formed, as a drive torque in the forward direction of the vehicle 10. In this case, the first rotating machine MG1 functions as a generator that generates a negative torque at the time of positive rotation. An electric power Wg generated by the first rotating machine MG1 is used to charge the battery 54, and is consumed by the second rotating machine MG2. The second rotating machine MG2 outputs the MG2 torque Tm through the use of all or part of the generated electric power Wg, or through the use of the electric power from the battery 54 as well as the generated electric power Wg. Accordingly, the engine 14 can drive the first rotating machine MG1 in such a manner as to generate the electric power with which the battery 54 is charged.

Although not shown in FIG. 3, in the collinear diagram in a motor running mode enabling motor running in which the vehicle runs with the engine 14 stopped and with the second rotating machine MG2 serving as a motive power source, the carrier CA0 does not rotate, and the MG2 torque Tm that is a positive torque at the time of positive rotation is input to the ring gear R0, in the differential mechanism 32. In this case, the first rotating machine MG1 coupled to the sun gear S0 is idly rotated at the time of negative rotation with no load applied thereto. That is, in the motor running mode, the engine 14 is not driven, the engine rotational speed Ne is made equal to zero, and the MG2 torque Tm is transmitted to the driving wheels 28 via the stepped shift unit 20 in which one of the AT first-speed to AT fourth-speed gear stages is formed, as a drive torque in the forward direction of the vehicle 10. The MG2 torque Tm mentioned herein is a power running torque at the time of positive rotation.

The straight lines L0R and LR indicated by broken lines in FIG. 3 represent relative speeds of the rotary elements in backward running in the motor running mode, respectively. In backward running in this motor running mode, the MG2 torque Tm as a negative torque at the time of negative rotation is input to the ring gear R0, and the MG2 torque Tm is transmitted to the driving wheels 28 via the stepped shift unit 20 in which the AT first-speed gear stage is formed, as a drive torque in the backward direction of the vehicle 10. In the vehicle 10, the MG2 torque Tm for backward running that is different in sign from the MG2 torque Tm for forward running at the time of forward running is output from the second rotating machine MG2 by the electronic control unit 90 that will be described later, with the low-side AT gear stage for forward running selected from among the AT gear stages, for example, the AT first-speed gear stage formed. Thus, the vehicle can run backward. In this case, the MG2 torque Tm for forward running is a power running torque that is a positive torque at the time of positive rotation, and the MG2 torque Tm for backward running is a power running torque that is a negative torque at the time of negative rotation. In this manner, the vehicle 10 runs backward by reversing the sign of the MG2 torque Tm through the use of the AT gear stage for forward running. The use of the AT gear stage for forward running means the use of the same AT gear stage as at the time of forward running. Incidentally, in the hybrid running mode as well, negative rotation of the second rotating machine MG2 can be realized as indicated by the straight line L0R. Therefore, the vehicle can run backward in the same manner as in the motor running mode.

In the motive power transmission device 12, the continuously variable shift unit 18 is configured. The continuously variable shift unit 18 is equipped with the differential mechanism 32 having three rotary elements, namely, the carrier CA0 as the first rotary element RE1 to which the engine 14 is coupled in such a manner as to enable the transmission of motive power, the sun gear S0 as the second rotary element RE2 to which the first rotating machine MG1 is coupled in such a manner as to enable the transmission of motive power, and the ring gear R0 as the third rotary element RE3 to which the intermediate transmission member 30 is coupled, and serves as an electric shift mechanism in which the differential state of the differential mechanism 32 is controlled through the control of the operating state of the first rotating machine MG1. From another point of view, the third rotary element RE3 to which the intermediate transmission member 30 is coupled is the third rotary element RE3 to which the second rotating machine MG2 is coupled in such a manner as to enable the transmission of motive power. That is, in the motive power transmission device 12, the continuously variable shift unit 18 having the differential mechanism 32 to which the engine 14 is coupled in such a manner as to enable the transmission of motive power and the first rotating machine MG1 coupled to the differential mechanism 32 in such a manner as to enable the transmission of motive power, and having the differential state of the differential mechanism 32 controlled through the control of the operating state of the first rotating machine MG1 is configured. The continuously variable shift unit 18 is operated as an electric continuously variable transmission in which a speed ratio γ0 (=Ne/Nm) as a value of the ratio between the engine rotational speed Ne that is the same value as the rotational speed of the coupling shaft 34 as the input rotary member and the MG2 rotational speed Nm as the rotational speed of the intermediate transmission member 30 as the output rotary member is changed.

For example, in the hybrid running mode, when the rotational speed of the sun gear S0 is raised or lowered through the control of the rotational speed of the first rotating machine MG1 with respect to the rotational speed of the ring gear R0 that is restrained by rotation of the driving wheels 28 through the formation of the AT gear stage in the stepped shift unit 20, the rotational speed of the carrier CA0, namely, the engine rotational speed Ne is raised or lowered. Accordingly, in hybrid running, the engine 14 can be operated at an operating point ensuring good efficiency. That is, the stepped shift unit 20 in which the AT gear stage is formed, and the continuously variable shift unit 18 that is operated as the continuously variable transmission can constitute the continuously variable transmission as the entire complex transmission 40 in which the continuously variable shift unit 18 and the stepped shift unit 20 are arranged in series.

Alternatively, the continuously variable shift unit 18 can also be shifted like a stepped transmission, and hence can be shifted like a stepped transmission as the entire complex transmission 40 by the stepped shift unit 20 in which the AT gear stage is formed and the continuously variable shift unit 18 that is shifted like a stepped transmission. That is, in the complex transmission 40, the stepped shift unit 20 and the continuously variable shift unit 18 can be controlled in such a manner as to selectively establish a plurality of gear stages that are different from one another in a speed ratio γt (=Ne/No) representing the value of the ratio to the output rotational speed No of the engine rotational speed Ne. In the present embodiment, each of the gear stages established in the complex transmission 40 is referred to as a simulated gear stage. The speed ratio γt is a total speed ratio consisting of the speed ratios of the continuously variable shift unit 18 and the stepped shift unit 20 that are arranged in series, and is a value (γt=γ0×γat) obtained by multiplying the speed ratio γ0 of the continuously variable shift unit 18 by the speed ratio γat of the stepped shift unit 20.

The simulated gear stages are assigned such that one or more of the simulated gear stages are established for each of the AT stages in the stepped shift unit 20, through combination of, for example, each of the AT gear stages of the stepped shift unit 20 and one or more of the speed ratios γ0 of the continuously variable shift unit 18. For example, the simulated gear stages are determined in advance such that the simulated first-speed to third-speed gear stages are established for the AT first-speed gear stage, the simulated fourth-speed to sixth-speed gear stages are established for the AT second-speed stage, the simulated seventh to ninth gear stages are established for the AT third-speed gear stage, and the simulated tenth-speed gear stage is established for the AT fourth-speed gear stage. In the complex transmission 40, different simulated gear stages are established at a certain one of the AT gear stages by controlling the continuously variable shift unit 18 such that the engine rotational speed Ne realizing the predetermined speed ratio γt is obtained for the output rotational speed No. Alternatively, in the complex transmission 40, a changeover among the simulated gear stages is made through the control of the continuously variable shift unit 18 in accordance with a changeover among the AT gear stages.

Referring again to FIG. 1, the vehicle 10 is equipped with the electronic control unit 90 as a controller including the control apparatus for the vehicle 10 regarding the control of the engine 14, the continuously variable shift unit 18, the stepped shift unit 20, and the like. In consequence, FIG. 1 is a view showing an input/output system of the electronic control unit 90, and also is a functional block diagram illustrating the essence of control functions performed by the electronic control unit 90. The electronic control unit 90 is configured to include a so-called microcomputer that is equipped with, for example, a CPU, a RAM, a ROM, an input/output interface, and the like, and the CPU performs various kinds of control of the vehicle 10 by performing signal processing in accordance with a program stored in the ROM in advance, while utilizing a temporary storage function of the RAM. The electronic control unit 90 is configured as separate electronic control units, namely, an electronic control unit for engine control, an electronic control unit for shift control, and the like, if necessary.

Various signals (e.g., the engine rotational speed Ne, the output rotational speed No corresponding to the vehicle speed V, an MG1 rotational speed Ng as a rotational speed of the first rotating machine MG1, an MG2 rotational speed Nm as the AT input rotational speed Ni, an accelerator depression amount θacc as the driver's acceleration operation amount representing the magnitude of the driver's acceleration operation, a throttle valve opening degree θth as an opening degree of an electronic throttle valve, a brake-on signal Bon as a signal indicating a state where a brake pedal for operating wheel brakes is operated by the driver, a brake operation amount Bra corresponding to a depression force of the brake pedal and representing the magnitude of depression operation of the brake pedal by the driver, a steering angle θsw and a steering direction Dsw of a steering wheel with which the vehicle 10 is equipped, a steering on-signal SWon as a signal indicating a state where the steering wheel is gripped by the driver, a driver state signal Dry as a signal indicating a state of the driver, a longitudinal acceleration Gx of the vehicle 10, a lateral acceleration Gy of the vehicle 10, a yaw rate Ryaw as a rotational angular velocity around a vertical axis of the vehicle 10, a battery temperature THbat, a battery charge/discharge current that, and a battery voltage Vbat of the battery 54, a hydraulic oil temperature THoil as a temperature of hydraulic oil, vehicle periphery information Iard, positional information Ivp, a communication signal Scom, navigation information Inavi, a drive support setting signal Sset as a signal indicating the driver's settings in drive support control such as automated driving control, cruise control, and the like, an operation position POSsh of a shift lever with which the vehicle 10 is equipped, and the like) based on values detected by various sensors and the like with which the vehicle 10 is equipped (e.g., an engine rotational speed sensor 60, an output rotational speed sensor 62, an MG1 rotational speed sensor 64, an MG2 rotational speed sensor 66, an accelerator depression amount sensor 68, a throttle valve opening degree sensor 70, a brake pedal sensor 71, a steering sensor 72, a driver state sensor 73, a G sensor 74, a yaw rate sensor 76, a battery sensor 78, an oil temperature sensor 79, a vehicle periphery information sensor 80, a vehicle position sensor 81, an external network communication antenna 82, a navigation system 83, a driving support setting switch group 84, a shift position sensor 85, and the like) respectively are supplied to the electronic control unit 90.

The driver's acceleration operation amount representing the magnitude of the driver's acceleration operation is an accelerator operation amount as an operation amount of an accelerator operation member, for example, an accelerator pedal, and is the driver's output request amount for the vehicle 10. As the driver's output request amount, the throttle valve opening degree θth or the like can also be used instead of the accelerator depression amount θacc.

The driver state sensor 73 includes, for example, at least one of a camera for photographing the driver's countenance, pupils, and the like, a biological information sensor for detecting the driver's biological information, and the like, and acquires the driver's states such as the driver's line of sight, the direction in which the driver's face is directed, the movements of the driver's eyeballs and face, and the driver's heart rate.

The vehicle periphery information sensor 80 includes, for example, at least one of a lidar, a radar, an in-vehicle camera, and the like, and directly acquires information on a road on which the vehicle 10 is running and information on objects around the vehicle 10. The lidar consists of a plurality of lidars for detecting, for example, an object in front of the vehicle 10, an object beside the vehicle 10, and an object behind the vehicle 10 respectively, or is a single lidar for detecting objects around the entire vehicle 10, and outputs object information on the detected objects as the vehicle periphery information Iard. The radar consists of a plurality of radars for detecting, for example, an object in front of the vehicle 10, an object close to an area in front of the vehicle 10, and an object close to an area behind the vehicle 10 respectively, and outputs object information on the detected objects as the vehicle periphery information Iard. The object information obtained by the lidar and the radar includes distances between the detected objects and the vehicle 10, and directions of the detected objects. The in-vehicle camera is, for example, a monocular camera or stereo camera that photographs areas in front of and behind the vehicle 10, and outputs photographed information as the vehicle periphery information Iard. This photographed information includes pieces of information on lanes of a running road, signs on the running road, parking spaces, and other vehicles, pedestrians, and obstacles on the running road.

The vehicle position sensor 81 includes a GPS antenna and the like. The positional information Ivp includes own vehicle positional information indicating a position of the vehicle 10 on a terrain or a map based on a GPS signal (a trajectory signal) or the like emitted by a global positioning system (GPS) satellite.

The navigation system 83 is a known navigation system having a display, a speaker, and the like. The navigation system 83 specifies an own vehicle position on map data stored in advance, based on the positional information Ivp. The navigation system 83 displays the own vehicle position on a map displayed on the display. When a destination is input to the navigation system 83, the navigation system 83 computes a running route from a place of departure to the destination, and gives instructions on the running route and the like to the driver through the use of the display, the speaker, or the like. The navigation information Inavi includes, for example, map information such as road information and facility information based on map data stored in advance in the navigation system 83. The road information includes pieces of information on road types such as urban road, suburban road, mountainous road, and mobile expressway or expressway, the branching and merging of roads, gradients of roads, and speed limits. The facility information includes pieces of information on spot types such as supermarkets, stores, restaurants, parking lots, parks, spots where the vehicle 10 is repaired, homes, and service areas on expressways, addresses, names, and the like. The service areas are spots equipped with facilities for parking, dining, and refueling on, for example, expressways.

The driving support setting switch group 84 includes an automated driving selection switch for performing automated driving control, a cruise switch for performing cruise control, a switch for setting a vehicle speed in cruise control, a switch for setting an inter-vehicle distance from a preceding vehicle in cruise control, a switch for performing lane keep control for causing the vehicle 10 to run while staying in a set lane, and the like.

The communication signal Scom includes road traffic information transmitted to and received from a center as an external device, for example, a road traffic information communication system, and/or vehicle-to-vehicle communication information directly transmitted to and received from other vehicles in the vicinity of the vehicle 10 without the intermediary of the center. The road traffic information includes, for example, information on traffic jams, accidents, construction works, required time lengths, and parking lots on roads. The vehicle-to-vehicle communication information includes, for example, vehicle information, running information, and traffic environment information. The vehicle information includes, for example, pieces of information indicating vehicle types such as passenger vehicle, truck, and two-wheel vehicle. The running information includes, for example, pieces of information such as the vehicle speed V, positional information, information on operation of the brake pedal, information on the blinking of a turn signal lamp, and information on the blinking of a hazard lamp. The traffic environment information includes, for example, pieces of information on traffic jams and construction works on roads.

Various command signals (e.g., an engine control command signal Se for controlling the engine 14, a rotating machine control command signal Smg for controlling each of the first rotating machine MG1 and the second rotating machine MG2, a hydraulic pressure control command signal Sat for controlling operation states of the engagement devices CB, an EOP control command signal Seop for controlling the operation of the EOP 58, the communication signal Scom, a brake control command signal Sbra for controlling braking torques generated by the wheel brakes, a steering control command signal Sste for controlling the steering of the wheels (the front wheels in particular), and an information announcement control command signal Sinf for warning or informing the driver) are output from the electronic control unit 90 to devices with which the vehicle 10 is equipped (e.g., the engine control devices 50, the inverter 52, the hydraulic pressure control circuit 56, the motor 59, the external network communication antenna 82, a wheel brake device 86, a steering device 88, and an information announcement device 89) respectively.

The wheel brake device 86 is a brake device that applies braking torques generated by the wheel brakes to the wheels respectively. The wheel brake device 86 supplies a brake hydraulic pressure to wheel cylinders provided in the wheel brakes respectively, in accordance with the driver's operation of, for example, depressing the brake pedal. In the wheel brake device 86, a master cylinder hydraulic pressure that is generated from a brake master cylinder and that corresponds in magnitude to the brake operation amount Bra is usually supplied to the wheel cylinders as the brake hydraulic pressure. On the other hand, in the wheel brake device 86, at the time of, for example, ABS control, skid suppression control, vehicle speed control, and automated driving control, a brake hydraulic pressure required for each control is supplied to the wheel cylinders for generation of the braking torques by the wheel brakes respectively. The wheels are the driving wheels 28 and driven wheels (not shown).

The steering device 88 applies an assist torque corresponding to, for example, the vehicle speed V, the steering angle θsw, the steering direction Dsw, or the yaw rate Ryaw to a steering system of the vehicle 10. At the time of, for example, automated driving control, the steering device 88 applies a torque for controlling the steering of the front wheels to the steering system of the vehicle 10.

The information announcement device 89 is a device that warns or informs the driver when, for example, a component regarding the running of the vehicle 10 breaks down or deteriorates in function. The information announcement device 89 is, for example, a display device such as a monitor, a display, or an alarm lamp, and/or an acoustic output device such as a speaker or a buzzer. The display device is a device that visually warns or informs the driver. The acoustic output device is a device that acoustically warns or informs the driver.

The vehicle 10 is further equipped with a transceiver 100, a first gateway ECU 110, a second gateway ECU 120, a connector 130, and the like.

The transceiver 100 is a piece of equipment that communicates with a server 200 as an external device that exists separately from the vehicle 10 and that is different from the vehicle 10. Each of the first gateway ECU 110 and the second gateway ECU 120 is a control device that is similar in hardware configuration to the electronic control unit 90 and that is provided to rewrite a vehicular program 91 stored in, for example, a rewritable ROM in the electronic control unit 90. The connector 130 is designed to connect an external rewriting device 210 that is an external device that exists separately from the vehicle 10 and that is different from the vehicle 10. The shape and electric signal of the connector 130 are determined by a known standard. The connector 130 can also be used as a connector for connecting a malfunction diagnosis device.

The server 200 is a system connected to a network outside the vehicle 10. The server 200 stores or provides an uploaded update program 202 for rewriting the vehicular program 91. The server 200 transmits the update program 202 to the vehicle 10 if necessary. The server 200 functions as a software distribution center for distributing the update program 202 and the like.

The transceiver 100 is connected to the network outside the vehicle 10, to which the server 200 is connected, via wireless communication R. The first gateway ECU 110 is connected to the transceiver 100, and serves to rewrite the vehicular program 91 through the use of the update program 202 received from the server 200 via wireless communication R by the transceiver 100. The second gateway ECU 120 is connected to the connector 130, and serves to rewrite the vehicular program 91 through the use of the external rewriting device 210 that is connected via the connector 130. In this manner, the electronic control unit 90 and the first gateway ECU 110 function as the control apparatus for the vehicle 10 that updates the vehicular program 91 through the use of the update program 202 received from the server 200 via wireless communication R. Incidentally, wireless communication R may be established with the server 200 via the external network communication antenna 82. Besides, the vehicle 10 and the external rewriting device 210 are configured to be connectible to each other in a wired manner via the connector 130, but may be configured to be connectible to each other in a wireless manner. Besides, for the sake of convenience, the vehicular program 91 is a term representing an object to be rewritten, but is also synonymous with a piece of vehicular software, vehicular data, and the like.

In order to realize the control for updating the vehicular program 91, the electronic control unit 90 is equipped with state determination means, namely, a state determination unit 92, and program update means, namely, a program update unit 93, and the first gateway ECU 110 is equipped with download performance means, namely, a download performance unit 112.

The state determination unit 92 determines whether or not the update program 202 exists in the server 200. The download performance unit 112 receives the update program 202 from the server 200 via wireless communication R, namely, downloads the update program 202, when the state determination unit 92 determines that the update program 202 exists in the server 200. The program update unit 93 rewrites the vehicular program 91 through the use of the update program 202 received from the server 200 by the download performance unit 112, namely, updates the vehicular program 91.

The electronic control unit 90 is further equipped with AT shift control means, namely, an AT shift control unit 94, hybrid control means, namely, a hybrid control unit 95, and driving control means, namely, a driving control unit 96 so as to realize various kinds of control in the vehicle 10.

Figure 4:
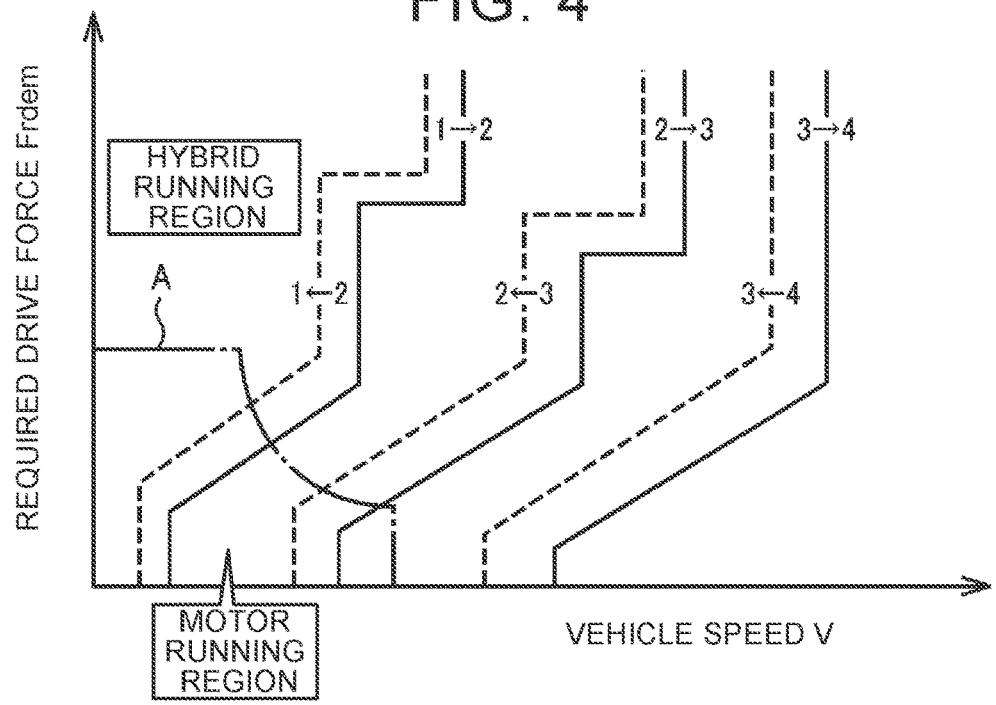
FIG. 4 is a view showing examples of a shift map used for shift control of the stepped shift unit and a motive power source changeover map used for changeover control between hybrid running and motor running, and also is a view showing a relationship therebetween.

The AT shift control unit 94 makes a determination on a shift of the stepped shift unit 20 through the use of an AT gear stage shift map as shown in, for example, FIG. 4, which represents a relationship stored after being obtained in advance through an experiment or from the standpoint of design, namely, a relationship determined in advance, and outputs the hydraulic pressure control command signal Sat for performing shift control of the stepped shift unit 20 to the hydraulic pressure control circuit 56 if necessary. The AT gear stage shift map represents a predetermined relationship having shift lines for making a determination on a shift of the stepped shift unit 20, on a two-dimensional coordinate system having, for example, the vehicle speed V and the required drive force Frdem as variables. In this case, the output rotational speed No or the like may be used instead of the vehicle speed V, and a required drive torque Trdem, the accelerator depression amount θacc, the throttle valve opening degree θth, or the like may be used instead of the required drive force Frdem. The respective shift lines on the AT gear stage shift map are upshift lines for making a determination on an upshift as indicated by solid lines, and downshift lines for making a determination on a downshift as indicated by broken lines.

The hybrid control unit 95 includes a function of engine control means, namely, an engine control unit for controlling the operation of the engine 14, and a function of rotating machine control means, namely, a rotating machine control unit for controlling the operation of the first rotating machine MG1 and the second rotating machine MG2 via the inverter 52, and performs hybrid drive control and the like by the engine 14, the first rotating machine MG1, and the second rotating machine MG2 through the control functions. The hybrid control unit 95 calculates the required drive force Frdem in the driving wheels 28 as a required drive amount, by applying the accelerator depression amount θacc and the vehicle speed V to, for example, a required drive amount map that represents a relationship determined in advance. As the required drive amount, the required drive torque Trdem (Nm) in the driving wheels 28, a required drive power Prdem (W) in the driving wheels 28, a required AT output torque on the output shaft 22, or the like can also be used instead of the required drive force Frdem (N).

The hybrid control unit 95 outputs the engine control command signal Se as a command signal for controlling the engine 14, and the rotating machine control command signal Smg as a command signal for controlling the first rotating machine MG1 and the second rotating machine MG2, in such a manner as to realize the required drive power Prdem based on the required drive torque Trdem and the vehicle speed V, in consideration of a chargeable electric power Win of the battery 54, a dischargeable electric power Wout of the battery 54, and the like. The engine control command signal Se is, for example, a command value of an engine power Pe as a power of the engine 14 that outputs the engine torque Te at the engine rotational speed Ne at that time. The rotating machine control command signal Smg is, for example, a command value of the electric power Wg generated by the first rotating machine MG1 that outputs the MG1 torque Tg at the MG1 rotational speed Ng at the time when a command as a reactive torque of the engine torque Te is output, and also a command value of an electric power Wm consumed by the second rotating machine MG2 that outputs the MG2 torque Tm at the MG2 rotational speed Nm at the time when the command is output.

The chargeable electric power Win of the battery 54 is an inputtable electric power that prescribes the limit of an electric power input to the battery 54, and the dischargeable electric power Wout of the battery 54 is an outputtable electric power that prescribes the limit of an electric power output from the battery 54. The chargeable electric power Win of the battery 54 and the dischargeable electric power Wout of the battery 54 are calculated based on, for example, the battery temperature THbat and a state of charge SOC (%) of the battery 54, by the electronic control unit 90. The state of charge SOC of the battery 54 is a value indicating a charge state of the battery 54, and is calculated based on, for example, the battery charge/discharge current that and the battery voltage Vbat, by the electronic control unit 90.

The hybrid control unit 95 performs continuously variable shift control of the continuously variable shift unit 18 to change the speed ratio γ0 of the continuously variable shift unit 18, by controlling the engine 14 and controlling the electric power Wg generated by the first rotating machine MG1, such that the engine rotational speed Ne and the engine torque Te that allow the engine power Pe for realizing the required drive power Prdem to be obtained are achieved, in consideration of an optimal fuel consumption point of the engine and the like, in the case where, for example, the continuously variable shift unit 18 is operated as a continuously variable transmission and hence the complex transmission 40 is operated as a continuously variable transmission as a whole. As a result of this control, the speed ratio γt of the complex transmission 40 that is operated as a continuously variable transmission is controlled.

The hybrid control unit 95 makes a determination on a shift of the complex transmission 40 through the use of, for example, a simulated gear stage shift map representing a relationship determined in advance, and performs shift control of the continuously variable shift unit 18 in such a manner as to selectively establish a plurality of simulated gear stages in coordination with shift control of the AT gear stage of the stepped shift unit 20 by the AT shift control unit 94, in the case where, for example, the continuously variable shift unit 18 is shifted like a stepped transmission and hence the complex transmission 40 is shifted like a stepped transmission as a whole. The simulated gear stages can be established by controlling the engine rotational speed Ne by the first rotating machine MG1 in accordance with the vehicle speed V, such that the speed ratios γt can be maintained, respectively. The speed ratio γt at each of the simulated gear stages is not necessarily required to be a constant value over the entire region of the vehicle speed V, but may be changed in a predetermined region, or may be limited by an upper-limit, a lower-limit, and the like of a rotational speed of each component. In this manner, the hybrid control unit 95 can perform shift control for changing the engine rotational speed Ne as in the case of stepped shift. Simulated stepped shift control for shifting the complex transmission 40 like a stepped transmission as a whole may simply be performed in priority to continuously variable shift control for operating the complex transmission 40 as a continuously variable transmission as a whole, in the case where, for example, the driver selects a running mode attaching importance to the running performance, such as a sport running mode, or where the required drive torque Trdem is relatively large. However, simulated stepped shift control may basically be performed except when the performance thereof is limited in a predetermined manner.

The hybrid control unit 95 selectively establishes the motor running mode or the hybrid running mode in accordance with a running state, as a running mode. For example, the hybrid control unit 95 establishes the motor running mode when the required drive power Prdem is in a motor running region that is smaller than a threshold determined in advance, and establishes the hybrid running mode when the required drive power Prdem is in a hybrid running region that is equal to or larger than the threshold determined in advance. An alternate long and short dash line A in FIG. 4 is a borderline for changing over the motive power source for causing the vehicle 10 to run between at least the engine 14 and only the second rotating machine MG2. That is, the alternate long and short dash line A in FIG. 4 is a borderline between a hybrid running region and a motor running region for making a changeover between hybrid running and motor running. A relationship determined in advance with the borderline as indicated by the alternate long and short dash line in FIG. 4 is an example of a motive power source changeover map constituted of two-dimensional coordinates using the vehicle speed V and the required drive force Frdem as variables. Incidentally, in FIG. 4, this motive power source changeover map is shown in conjunction with the AT gear stage shift map for the sake of convenience.

The hybrid control unit 95 establishes the hybrid running mode in the case where the state of charge SOC of the battery 54 is equal to or smaller than an engine startup threshold determined in advance even when the required drive power Prdem is in the motor running region. The motor running mode is a running state where the vehicle 10 runs with the engine 14 stopped and with the second rotating machine MG2 generating a drive torque. The hybrid running mode is a running state where the vehicle 10 runs with the engine 14 in operation. The engine startup threshold is a threshold determined in advance for determining that the state of charge SOC indicates the necessity to forcibly start up the engine 14 and charge the battery 54.

The hybrid control unit 95 performs startup control for starting up the engine 14 when the hybrid running mode is established in stopping the operation of the engine 14. The hybrid control unit 95 starts up the engine 14 by igniting the engine 14 when the engine rotational speed Ne becomes equal to or higher than a predetermined rotational speed at which the engine 14 can be ignited, while raising the engine rotational speed Ne by the first rotating machine MG1, in starting up the engine 14. That is, the hybrid control unit 95 starts up the engine 14 by cranking the engine 14 by the first rotating machine MG1.

The driving control unit 96 can perform manual driving control for causing the vehicle 10 to run based on the driver's driving operation, and driving support control for driving the vehicle 10 regardless of the driver's driving operation, as driving control of the vehicle 10. The manual driving control is driving control for causing the vehicle 10 to run through manual driving based on the driver's driving operation. The manual driving is a driving method for causing the vehicle 10 to normally run through the driver's driving operation such as accelerator operation, brake operation, and steering operation. The driving support control is driving control for causing the vehicle 10 to run based on, for example, driving support for automatically supporting driving operation. The driving support is a driving method of causing the vehicle 10 to run by, for example, automatically accelerating/decelerating and braking the vehicle 10 through the control by the electronic control unit 90 based on signals, information, and the like from the various sensors, regardless of the driver's driving operation (intention). The driving support control is automated driving control or the like for causing the vehicle 10 to run through automated driving in which a target running state is automatically set based on, for example, a destination and map information input by the driver and acceleration/deceleration, braking, steering, and the like of the vehicle 10 are automatically carried out based on the target running state. Incidentally, in the broad sense of the term, driving support control may include cruise control in which the driver performs part of driving operation such as steering operation and acceleration/deceleration, braking, and the like are automatically performed.

The driving control unit 96 performs manual driving control by establishing the manual driving mode in the case where driving through driving support is not selected with an automated driving selection switch, a cruise switch, and the like belonging to the driving support setting switch group 84 turned off. The driving control unit 96 performs manual driving control by outputting commands for controlling the stepped shift unit 20, the engine 14, and the rotating machines MG1 and MG2 respectively, to the AT shift control unit 94 and the hybrid control unit 95.

The driving control unit 96 performs automated driving control by establishing the automated driving mode when automated driving is selected through the operation of the automated driving selection switch belonging to the driving support setting switch group 84 by the driver. In concrete terms, the driving control unit 96 automatically sets the target running state based on a destination input by the driver, own vehicle positional information based on the positional information Ivp, map information based on the navigation information Inavi and the like, various pieces of information on the running road based on the vehicle periphery information Iard, and the like. The driving control unit 96 performs automated driving control by outputting the brake control command signal Sbra for obtaining a required braking torque to the wheel brake device 86 and outputting the steering control command signal Sste for controlling the steering of the front wheels to the steering device 88, in addition to outputting the commands for controlling the stepped shift unit 20, the engine 14, and the rotating machines MG1 and MG2 respectively to the AT shift control unit 94 and the hybrid control unit 95, in such a manner as to automatically accelerate/decelerate, brake, and steer the vehicle 10 based on the set target running state.

By the way, when the update program 202 is downloaded from the server 200 via wireless communication R, downloading may be interrupted due to a communication failure or the like. In such a case, the downloading of the update program 202 may not be completed during, for example, a single session of the running of the vehicle 10 from a state where an ignition is on to a state where the ignition is off, so the vehicular program 91 may be updated with a delay. The state where the ignition is on is, for example, a state where the vehicle 10 can generate a drive torque, namely, a state where the vehicle 10 generates a drive torque as soon as the accelerator is turned on. The state where the ignition is off is, for example, a state where the vehicle 10 cannot generate a drive torque.

For example, in the case where a running route to a destination is determined by the navigation system 83 or the like, or in the case where a running route for use in commuting or the like is determined, it is possible to grasp whether or not the downloading of the update program 202 will be completed while the vehicle 10 runs following the running route. If the downloading of the update program 202 will be completed during the running of the vehicle 10, the update program 202 may be downloaded. On the other hand, if the downloading of the update program 202 will not be completed during the running of the vehicle 10, it is conceivable to change the driving method such that the downloading of the update program 202 can be completed. The electronic control unit 90 suggests this driving method to the driver to restrain or prevent the vehicular program 91 from being updated with a delay.

In concrete terms, the electronic control unit 90 is further equipped with required time calculation means, namely, a required time calculation unit 97, communication-enabled time estimation means, namely, a communication-enabled time estimation unit 98, and driving method suggestion means, namely, a driving method suggestion unit 99 to realize the control function of restraining or preventing the vehicular program 91 from being updated with a delay.

The required time calculation unit 97 calculates a required download time TMdl required for the reception of the update program 202, when the state determination unit 92 determines that the update program 202 exists in the server 200. The required download time TMdl is a time needed to download the update program 202. The required time calculation unit 97 calculates the required download time TMdl by dividing a capacity (which is synonymous with size) of the update program 202 by a communication speed in wireless communication R. The communication speed in wireless communication R may differ depending on, for example, the hour, or may differ depending on the region where the vehicle 10 runs. The required time calculation unit 97 acquires the communication speed in wireless communication R through test connection with the server 200, for example, in calculating the required download time TMdl. Alternatively, the required time calculation unit 97 may acquire, from the server 200, big data on the communication speed in wireless communication R between, for example, the server 200 and other vehicles.

The communication-enabled time estimation unit 98 calculates a communication-enabled time TMcom that enables reception of the update program 202 from the server 200 via wireless communication R, when the state determination unit 92 determines that the update program 202 exists in the server 200. The communication-enabled time TMcom mentioned herein is not an actual communication-enabled time obtained as a result of the actual running of the vehicle 10, but is a communication-enabled time predicted for the running of the vehicle 10 in the future, and hence is synonymous with an estimated value of the communication-enabled time TMcom. The communication-enabled time estimation unit 98 estimates the communication-enabled time TMcom.

Figure 5:
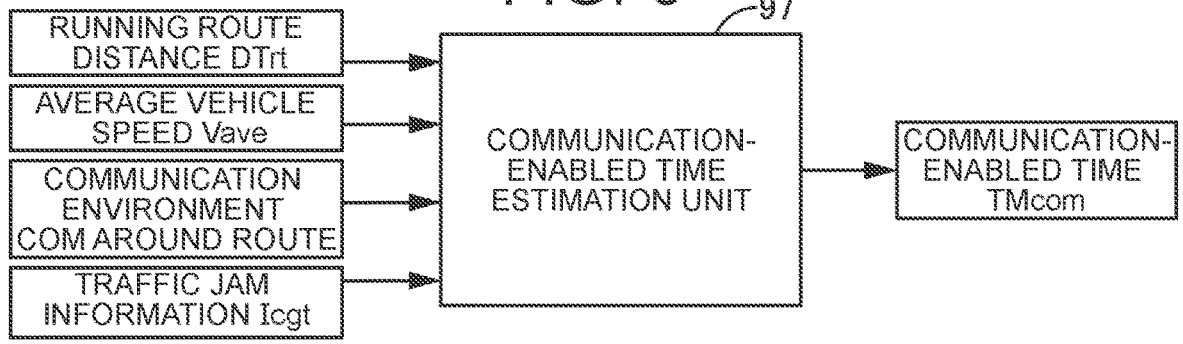
FIG. 5 is a block diagram representing inputs to and an output from a communication-enabled time estimation unit.

FIG. 5 is a block diagram representing inputs to the communication-enabled time estimation unit 98 and an output from the communication-enabled time estimation unit 98. In FIG. 5, a running route distance DTrt is a running distance in the case where the vehicle 10 runs along a running route RT from a current vehicle position to a predetermined destination DNfx. The current vehicle position is a position of the vehicle 10 based on the positional information Ivp. The destination DNfx is, for example, a destination input to the navigation system 83, or a destination based on the past running pattern adopted by the driver. This running pattern is expressed by, for example, the running route RT, and an average vehicle speed at the time when the vehicle 10 runs along the running route RT. The past running pattern adopted by the driver is, for example, a running pattern in the history of the running of the vehicle 10 by the driver, such as a running pattern in commuting by the vehicle 10, or a running pattern in going shopping by the vehicle 10. The running route distance DTrt is computed by, for example, the navigation system 83. The average vehicle speed Vave is an average of running speeds in the case where the vehicle 10 runs along the running route RT. The average vehicle speed Vave is an average vehicle speed that is predicted in the case where the vehicle 10 runs along the running route RT. The average vehicle speed Vave is computed by the navigation system 83, based on, for example, a speed limit on the running route RT, or an average vehicle speed during the running of the vehicle 10 along the running route RT by the driver in the past. A communication environment COM around the route is, for example, an environment of wireless communication R around the route RT based on the road information stored in the navigation system 83, such as urban road, suburban road, and tunnel, information on a base station for wireless communication R acquired from the server 200, and the like. Traffic jam information Icgt is, for example, traffic jam information on the running route RT based on information on traffic jams on roads as included in the communication signal Scom. The communication-enabled time estimation unit 98 calculates the communication-enabled time TMcom on the running route RT, based on the running route distance DTrt, the average vehicle speed Vave, the communication environment COM around the route, the traffic jam information Icgt, and the like.

The communication-enabled time estimation unit 98 determines, based on the communication environment COM around the route, whether or not wireless communication R can be established on the running route RT. To determine whether or not wireless communication R can be established on the running route RT is, for example, to determine running roads on the running route R where wireless communication R can be normally established, and running roads on the running route R where wireless communication R is interrupted. The communication-enabled time estimation unit 98 corrects the average vehicle speed Vave based on the traffic jam information Icgt. The communication-enabled time estimation unit 98 calculates the communication-enabled time TMcom on the running route RT, by dividing the running distance along the running roads where wireless communication R can be normally established, as part of the running route distance DTrt, by the average vehicle speed Vave corrected based on the traffic jam information Icgt.

As described above, the communication-enabled time estimation unit 98 calculates the communication-enabled time TMcom on the running route RT, based on the running route distance DTrt and the average vehicle speed Vave in running along the running route RT. The communication-enabled time estimation unit 98 calculates the communication-enabled time TMcom on the running route RT, based on whether or not wireless communication R can be established on the running route RT. The communication-enabled time estimation unit 98 calculates the communication-enabled time TMcom on the running route RT, based on the past running pattern adopted by the driver.

A case where the vehicle 10 runs along a running route RTfx determined in advance from the current vehicle position to the predetermined destination DNfx will be exemplified hereinafter. The running route RTfx is a running route computed by the navigation system 83, a running route based on the past running pattern adopted by the driver, or the like. The running route distance DTrt is a running distance in the case where the vehicle 10 runs along the running route RTfx. The average vehicle speed Vave is a running speed in the case where the vehicle 10 runs along the running route RTfx. The communication environment COM around the route is an environment of wireless communication R around the running route RTfx. The traffic jam information Icgt is traffic jam information on the running route RTfx. The communication-enabled time estimation unit 98 calculates the communication-enabled time TMcom on the running route RTfx, based on the running route distance DTrt, the average vehicle speed Vave, the communication environment COM around the route, the traffic jam information Icgt, and the like in the case where the vehicle 10 runs along the running route RTfx. The communication-enabled time estimation unit 98 determines, based on the communication environment COM around the route, whether or not wireless communication R can be established on the running route RTfx. The communication-enabled time estimation unit 98 corrects the average vehicle speed Vave based on the traffic jam information Icgt on the running route RTfx. The communication-enabled time estimation unit 98 calculates the communication-enabled time TMcom on the running route RTfx, by dividing the running distance along the running roads where wireless communication R can be normally established on the running route RTfx as part of the running route distance DTrt, by the average vehicle speed Vave corrected based on the traffic jam information Icgt. In this manner, the communication-enabled time estimation unit 98 calculates the communication-enabled time TMcom on the running route RTfx, based on the running route distance DTrt and the average vehicle speed Vave in the case where the vehicle 10 runs along the running route RTfx. The communication-enabled time estimation unit 98 calculates the communication-enabled time TMcom on the running route RTfx, based on whether or not wireless communication R can be established on the running route RTfx. The communication-enabled time estimation unit 98 calculates the communication-enabled time TMcom on the running route RTfx, based on the past running pattern adopted by the driver.

The state determination unit 92 determines whether or not the required download time TMdl is longer than the communication-enabled time TMcom on the running route RTfx, when it is determined that the update program 202 exists in the server 200. From another point of view, the state determination unit 92 determines whether or not the download performance unit 112 can download the update program 202 on the running route RTfx, by determining whether or not the required download time TMdl is equal to or shorter than the communication-enabled time TMcom on the running route RTfx.

The download performance unit 112 downloads the update program 202 from the server 200 via wireless communication R, when the state determination unit 92 determines that the required download time TMdl is equal to or shorter than the communication-enabled time TMcom on the running route RTfx.

The driving method suggestion unit 99 suggests, to the driver, a driving method ensuring the communication-enabled time TMcom that is equal to or longer than the required download time TMdl, when the state determination unit 92 determines that the required download time TMdl is longer than the communication-enabled time TMcom on the running route RTfx. The driving method suggestion unit 99 may, for example, display the driving method or provide vocal guidance in the information announcement device 89 and/or the navigation system 83, as a suggestion of the driving method to the driver.

Figure 6:
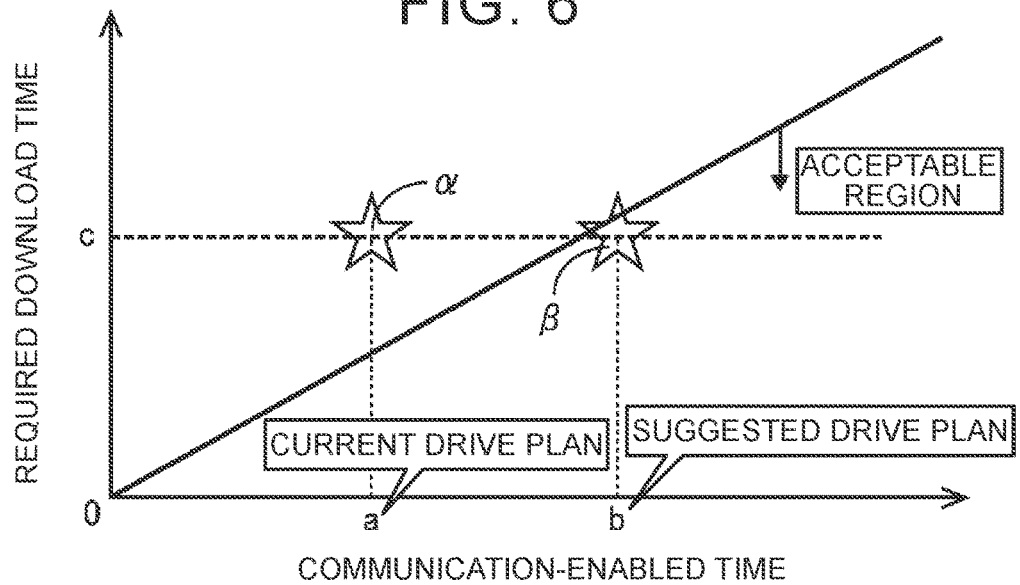
FIG. 6 is a view illustrating an example of a driving method ensuring a communication-enabled time that is equal to or longer than a required download time.

FIG. 6 is a view illustrating an example of the driving method ensuring the communication-enabled time TMcom that is equal to or longer than the required download time TMdl. In FIG. 6, a required download time c is an example of the required download time TMdl. "Acceptable region" is a region where the required download time TMdl is equal to or shorter than the communication-enabled time TMcom, and is a region where the update program 202 can be downloaded. In the case where an intersection of the required download time c and the communication-enabled time TMcom on the running route RTfx is in the acceptable region, the update program 202 is downloaded by the download performance unit 112 on the running route RTfx.

In FIG. 6, a communication-enabled time a is an example of the communication-enabled time TMcom in a current drive plan (=driving plan). The drive plan includes, for example, a running route, and a vehicle speed in running along the running route. The current drive plan is a drive plan using the running route RTfx determined in advance. Accordingly, the communication-enabled time a is an example of the communication-enabled time TMcom on the running route RTfx. As shown in FIG. 6, in the case where an intersection a of the required download time c and the communication-enabled time a is not in the acceptable region, a drive plan with the intersection in the acceptable region is suggested. A communication-enabled time b is an example of the communication-enabled time TMcom in the suggested drive plan. A drive plan using a new running route RTnew that is different from the running route RTfx and that makes it possible to realize the communication-enabled time b intersecting with the required download time c in the acceptable region is suggested.

The driving method suggestion unit 99 suggests, to the driver, a drive plan using the new running route RTnew that is different from the running route RTfx determined in advance and that extends from the current vehicle position to the predetermined destination DNfx, as a driving method ensuring the communication-enabled time TMcom that is equal to or longer than the required download time TMdl.

As the new running route RTnew, the running route RT where the communication-enabled time TMcom is equal to or longer than the required download time TMdl is selected in consideration of, for example, a running route where the running route distance DTrt is long, a running route where the average vehicle speed Vave is low, a running route bypassing roads where wireless communication R is interrupted, and a running route followed by the driver in the past. The driving method suggestion unit 99 sets the new running route RTnew based on the past running pattern adopted by the driver. The driving method suggestion unit 99 sets the new running route RTnew, based on whether or not wireless communication R can be established on the running route RT from the current vehicle position to the predetermined destination DNfx.

Figure 7:
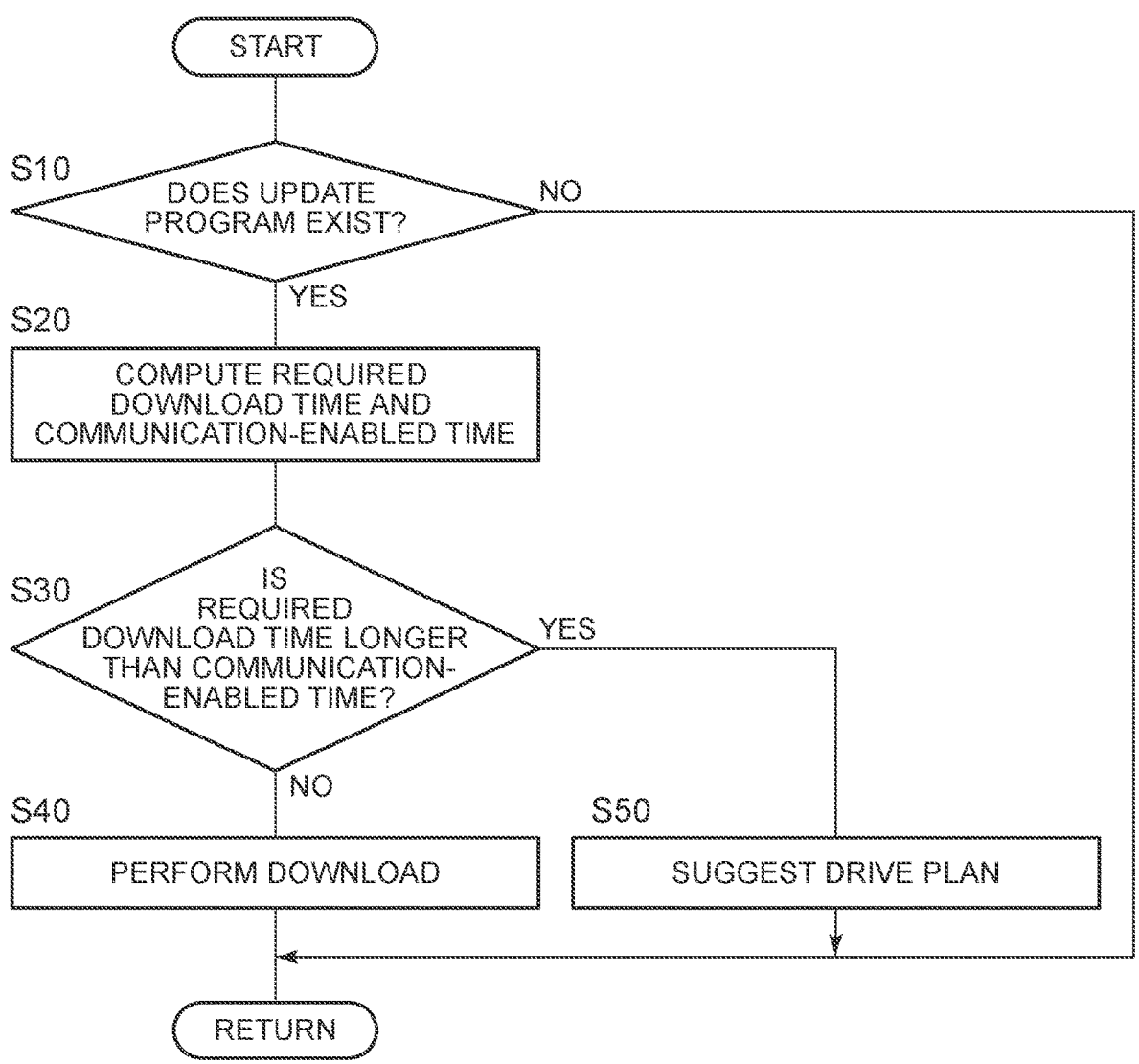
FIG. 7 is a flowchart illustrating the essence of a control operation of an electronic control unit and a first gateway ECU, and is a flowchart illustrating a control operation for restraining or preventing a vehicular program from being updated with a delay.

FIG. 7 is a flowchart illustrating the essence of the control operation of the electronic control unit 90 and the first gateway ECU 110, and is a flowchart illustrating the control operation for restraining or preventing the vehicular program 91 from being updated with a delay. This flowchart is, for example, repeatedly carried out.

In FIG. 7, first of all, in step (the term "step" will be omitted hereinafter) S10 corresponding to the function of the state determination unit 92, it is determined whether or not the update program 202 exists in the server 200. If the result of the determination in S10 is negative, the present routine is ended. If the result of the determination in step S10 is positive, the required download time TMdl and the communication-enabled time TMcom on the running route RTfx are calculated in S20 corresponding to the functions of the required time calculation unit 97 and the communication-enabled time estimation unit 98. Subsequently, in S30 corresponding to the function of the state determination unit 92, it is determined whether or not the required download time TMdl is longer than the communication-enabled time TMcom. If the result of the determination in S30 is negative, the update program 202 is downloaded from the server 200 via wireless communication R, in S40 corresponding to the function of the download performance unit 112. On the other hand, if the result of the determination in S30 is positive, a drive plan using the new running route RTnew that is different from the running route RTfx and that ensures the communication-enabled time TMcom equal to or longer than the required download time TMdl is suggested to the driver, in S50 corresponding to the function of the driving method suggestion unit 99.

As described above, according to the present embodiment, when the required download time TMdl is equal to or shorter than the communication-enabled time TMcom on the running route RTfx, the update program 202 is received from the server 200 via wireless communication R, so the vehicular program 91 is appropriately updated. Besides, when the required download time TMdl is longer than the communication-enabled time TMcom on the running route RTfx, a driving method ensuring the communication-enabled time TMcom that is equal to or longer than the required download time TMdl is suggested to the driver, so the update program 202 is easy to receive via wireless communication R. In consequence, the opportunities to update the vehicular program 91 can be ensured. That is, the vehicular program 91 can be restrained or prevented from being updated with a delay.

Besides, according to the present embodiment, the communication-enabled time TMcom on the running route RTfx is calculated based on the running route distance DTrt and the average vehicle speed Vave in the case where the vehicle 10 runs along the running route RTfx determined in advance. Therefore, the communication-enabled time TMcom on the running route RTfx is appropriately calculated, the update program 202 is appropriately received, or a driving method ensuring the communication-enabled time TMcom is appropriately suggested.

Besides, according to the present embodiment, the communication-enabled time TMcom on the running route RTfx is calculated based on whether or not wireless communication R can be established on the running route RTfx determined in advance. Therefore, the communication-enabled time TMcom on the running route RTfx is appropriately calculated, the update program 202 is appropriately received, or a driving method ensuring the communication-enabled time TMcom is appropriately suggested.

Besides, according to the present embodiment, the communication-enabled time TMcom on the running route RTfx is calculated based on the past running pattern adopted by the driver. Therefore, the communication-enabled time TMcom on the running route RTfx is appropriately calculated, the update program 202 is appropriately received, or a driving method ensuring the communication-enabled time TMcom is appropriately suggested.

Besides, according to the present embodiment, as a driving method ensuring the communication-enabled time TMcom that is equal to or longer than the required download time TMdl, a drive plan using the new running route RTnew that is different from the running route RTfx determined in advance and that extends from the current vehicle position to the predetermined destination DNfx is suggested to the driver. Therefore, the update program 202 is easy to receive appropriately via wireless communication R.

Besides, according to the present embodiment, the new running route RTnew is set based on the past running pattern adopted by the driver. Therefore, a drive plan ensuring the communication-enabled time TMcom is appropriately suggested.

Besides, according to the present embodiment, the new running route RTnew is set based on whether or not wireless communication R can be established on the running route RT from the current vehicle position to the predetermined destination DNfx. Therefore, a drive plan ensuring the communication-enabled time TMcom is appropriately suggested.

Next, another one of the embodiments of the present disclosure will be described. Incidentally, in the following description, components that are common between the embodiments will be denoted by the same reference symbols respectively, and the description thereof will be omitted.

In the foregoing first embodiment, the driving method suggestion unit 99 suggests, to the driver, the drive plan using the new running route RTnew that is different from the running route RTfx determined in advance and that extends from the current vehicle position to the predetermined destination DNfx, as the driving method ensuring the communication-enabled time TMcom that is equal to or longer than the required download time TMdl. The suggestion of this drive plan is premised on, for example, manual driving.

In the present embodiment, the driving method suggestion unit 99 suggests automated driving, as a driving method ensuring the communication-enabled time TMcom that is equal to or longer than the required download time TMdl, instead of the mode in the foregoing first embodiment. For example, when manual driving control is being performed, the driving method suggestion unit 99 suggests a changeover from manual driving to automated driving, as the driving method ensuring the communication-enabled time TMcom that is equal to or longer than the required download time TMdl. In this case, when the driver selects automated driving, the driving control unit 96 performs automated driving control for automatically setting a target running state where the vehicle 10 runs along the new running route RTnew that is different from the running route RTfx and that ensures, for example, the communication-enabled time TMcom equal to or longer than the required download time TMdl, and causing the vehicle 10 to run through automated driving for automatically accelerating/decelerating, braking, and steering the vehicle 10 based on the set target running state.

As described above, according to the present embodiment, automated driving is suggested as the driving method ensuring the communication-enabled time TMcom that is equal to or longer than the required download time TMdl. Therefore, the update program 202 is easy to receive appropriately via wireless communication R.

Although the embodiments of the present disclosure have been described above in detail based on the drawings, the present disclosure is also applicable to other aspects.

For example, in each of the foregoing embodiments, the electronic control unit 90 and the first gateway ECU 110 function as the control apparatus for the vehicle 10 that updates the vehicular program 91 through the use of the update program 202 received from the server 200 via wireless communication R, but an applicable embodiment of the present disclosure is not limited to this aspect. For example, the first gateway ECU 110 may be equipped with all, some, or one of the required time calculation unit 97, the communication-enabled time estimation unit 98, and the driving method suggestion unit 99. Alternatively, the electronic control unit 90 may be equipped with the download performance unit 112.

Besides, in the foregoing first embodiment, the drive plan using the new running route RTnew, which is suggested as the driving method ensuring the communication-enabled time TMcom equal to or longer than the required download time TMdl, may be realized through automated driving.

Besides, in each of the foregoing embodiments, the vehicle 10 equipped with the complex transmission 40 is exemplified as a vehicle to which the present disclosure is applied, but an applicable embodiment of the present disclosure is not limited to the vehicle 10. The present disclosure is also applicable to any vehicle with a vehicular program that is updated through the use of an update program received from an external device that exists separately from the vehicle via wireless communication.

Incidentally, the foregoing is nothing more than the embodiments. The present disclosure can be carried out in modes subjected to various alterations and improvements based on the knowledge of those skilled in the art.

What is claimed is:

1. A vehicle control apparatus that updates a vehicular program through use of an update program received from an external device that exists separately from a vehicle via wireless communication, the vehicle control apparatus comprising:
    a required time calculation unit that calculates a required download time that is needed to receive the update program;
    a communication-enabled time estimation unit that calculates an estimated value of a communication-enabled time that allows the update program to be received from the external device via the wireless communication;
    a download performance unit that receives the update program from the external device via the wireless communication, when the required download time is equal to or shorter than the estimated value of the communication-enabled time; and
    a driving method suggestion unit that suggests, to a driver, a driving method ensuring the communication-enabled time that is equal to or longer than the required download time, when the required download time is longer than the estimated value of the communication-enabled time.

2. The vehicle control apparatus according to claim 1, wherein
    the communication-enabled time estimation unit calculates the estimated value of the communication-enabled time, based on a running distance and a running speed in a case where the vehicle runs along a running route determined in advance from a current vehicle position to a predetermined destination.

3. The vehicle control apparatus according to claim 1, wherein
    the communication-enabled time estimation unit calculates the estimated value of the communication-enabled time, based on a feasibility of the wireless communication on a running route determined in advance from a current vehicle position to a predetermined destination.

4. The vehicle control apparatus according to claim 1, wherein
the communication-enabled time estimation unit calculates the estimated value of the communication-enabled time, based on a past running pattern adopted by the driver.

5. The vehicle control apparatus according to claim 1, wherein
the driving method suggestion unit suggests, as the driving method, a driving plan that does not use a running route determined in advance from a current vehicle position to a predetermined destination but uses a new running route from the vehicle position to the destination.

6. The vehicle control apparatus according to claim 5, wherein
the driving method suggestion unit sets the new running route, based on a past running pattern adopted by the driver.

7. The vehicle control apparatus according to claim 5, wherein
the driving method suggestion unit sets the new running route, based on a feasibility of the wireless communication on the running route from the vehicle position to the destination.

8. The vehicle control apparatus according to claim 1, wherein
the driving method suggestion unit suggests, as the driving method, automated driving for causing the vehicle to run by automatically accelerating or decelerating, braking, and steering the vehicle.

* * * * *